United States Patent
Huang et al.

(10) Patent No.: US 10,037,094 B2
(45) Date of Patent: Jul. 31, 2018

(54) CARRIER TOUCH SENSING SYSTEM CAPABLE OF PERFORMING PHASE CALIBRATION AND CARRIER SIGNAL DEMODULATION

(71) Applicant: NOVATEK Microelectronics Corp., Hsin-Chu (TW)

(72) Inventors: Chun-Ching Huang, Hsinchu County (TW); Hung-Cheng Kuo, Hsinchu (TW); Chun-Hung Chen, Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 232 days.

(21) Appl. No.: 14/925,986

(22) Filed: Oct. 29, 2015

(65) Prior Publication Data
US 2017/0123523 A1 May 4, 2017

(51) Int. Cl.
*G06F 3/041* (2006.01)
*G06F 3/044* (2006.01)

(52) U.S. Cl.
CPC ........... *G06F 3/041* (2013.01); *G06F 3/0418* (2013.01); *G06F 3/044* (2013.01)

(58) Field of Classification Search
USPC ....................................... 345/178; 178/18.01
See application file for complete search history.

(56) References Cited

U.S. PATENT DOCUMENTS

| | | | |
|---|---|---|---|
| 2011/0063993 A1* | 3/2011 | Wilson | G06F 3/044 370/254 |
| 2015/0084899 A1* | 3/2015 | Park | G06F 3/03545 345/173 |
| 2016/0148034 A1* | 5/2016 | Kremin | G06K 9/0002 382/124 |

FOREIGN PATENT DOCUMENTS

| | | |
|---|---|---|
| CN | 104220967 A | 12/2014 |
| CN | 104484066 A | 4/2015 |
| TW | 201122922 A1 | 7/2011 |
| TW | 201523406 A | 6/2015 |

* cited by examiner

*Primary Examiner* — Chad Dicke
(74) *Attorney, Agent, or Firm* — Winston Hsu (57) ABSTRACT

A carrier touch sensing system includes a demodulation circuit coupled to a touch panel, used for performing in-phase and quadrature demodulations to a plurality of carrier sensing signals to generate and store a plurality of phase delay information if the carrier touch sensing system operates in a phase calibration mode. The demodulation circuit is further used for performing in-phase demodulation to the plurality of carrier sensing signals according to the plurality of phase delay information to generate a plurality of touch signals if the carrier touch sensing system operates in a normal scan mode.

17 Claims, 6 Drawing Sheets

CARRIER TOUCH SENSING SYSTEM CAPABLE OF PERFORMING PHASE CALIBRATION AND CARRIER SIGNAL DEMODULATION

BACKGROUND OF THE INVENTION

1. Field of the Invention

The present invention relates to a carrier touch sensing system, and more particularly, to a carrier touch sensing system capable of performing phase calibration and carrier signal demodulation via in-phase and quadrature demodulations.

2. Description of the Prior Art

A touch display device provides intuitional and easy operations and has been widely utilized among electrical products. In general, a touch display device may be composed of a display panel and a touch panel, wherein the touch panel may include a plurality of driving electrodes, a plurality of receiving electrodes and a demodulation circuit. Traditionally, the driving electrodes of the touch panel are sequentially and respectively inputted with an impulse signal, the receiving electrodes of the touch panel receive sensing signals induced by the impulse signal. The demodulation circuit detects a touch event on the touch panel and a location corresponding to the touch event according to the sensing signals, so as to generate a touch signal and realize a function of touch control.

Recently, a carrier touch sensing system is introduced to the industry to improve the function of touch control. A touch panel for the carrier touch sensing system is inputted with carrier signals instead of an impulse signal, wherein the carrier signals may be sinusoidal waves such as sine-waves or cosine-waves.

During propagation of the carrier signals in the touch panel, carrier sensing signals received by a demodulation circuit may have phase delays due to different characteristics of the touch panel, such as production procedures, operating performances, environment temperatures, noise interferences, and so on. Without considering the phase delays of the carrier signals, the demodulation circuit may generate wrong touch signals. In such a situation, once the carrier touch sensing system is integrated with other electronic devices, such as a display, a smart phone, a tablet computer, or a laptop computer, the wrong touch signals may cause problems regarding touch controls.

In addition, the phase delay varies due to operating conditions of the touch panel; in other words, the phase delays need to be calibrated under certain operating conditions to maintain a signal integrity of the touch signals.

Therefore, how to demodulate the carrier sensing signals to generate the correct touch signals and the phase delay and calibrate the phase delays has become a critical issue in the industry.

SUMMARY OF THE INVENTION

It is therefore an object of the present invention to provide carrier touch sensing system capable of phase calibration and carrier signal demodulation via in-phase and quadrature demodulations.

The carrier touch sensing system includes a driving circuit, a touch panel, and a demodulation circuit. The demodulation circuit is coupled to the touch panel, used for performing in-phase and quadrature demodulations to a plurality of carrier sensing signals to generate and store a plurality of phase delay information if the carrier touch sensing system operates in a phase calibration mode. The demodulation circuit is further used for performing in-phase demodulation to the plurality of carrier sensing signals according to the plurality of phase delay information to generate a plurality of touch signals if the carrier touch sensing system operates in a normal scan mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
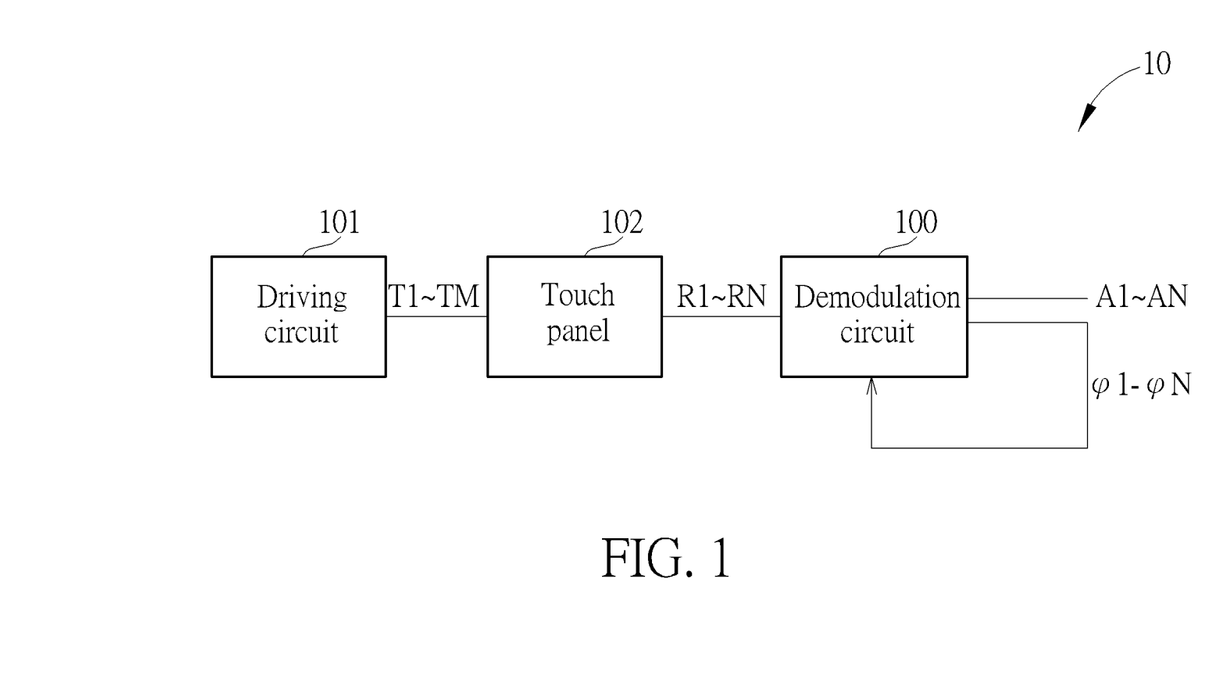
FIG. 1 is a functional block diagram of a carrier touch sensing system.

Please refer to FIG. 1, which is a functional block diagram of a carrier touch sensing system 10. The carrier touch sensing system 10 includes a driving circuit 101, a touch panel 102, and a demodulation circuit 100. The driving circuit 101 is used for generating a plurality of carrier driving signals T1~TM to the touch panel 102. The touch panel 102 is coupled to the driving circuit 101 and used for receiving the plurality of carrier driving signals T1~TM to generate a plurality of carrier sensing signals R1~RN, wherein a size of the touch panel 102 is M*N. The demodulation circuit 100 is coupled to the touch panel 102 and used for generating a plurality of touch signals A1~AN and a plurality of phase delays $\varphi 1$~$\varphi N$ according to the plurality of carrier sensing signals R1~RN, thereby a touch event on the touch panel 102 may be detected according to the plurality of touch signals A1~AN and the plurality of phase delays $\varphi 1$~$\varphi N$.

The carrier touch sensing system 10 may operate in a normal scan mode or a phase calibration mode. In practice, physical characteristics of the touch panel 102 are fixed once it is made, so the phase delays $\varphi 1$~$\varphi N$ may be assumed to be constants in a period of time if environmental conditions of the carrier touch sensing system 10 do not change during the period of time. Therefore, the carrier touch sensing system 10 operates in the phase calibration mode only when it is needed. For example, the carrier touch sensing system 10 operates in the phase calibration mode when (1) firstly turned on, i.e. initialization; (2) operating for a period of time, i.e. regular calibration; (3) operating performance or an operating frequency is changed; and (4) an irregular noise is detected.

In addition, a circuit structure of the demodulation circuit 100 may be changed to adapt to different modes. Specifically, the demodulation circuit 100 may perform in-phase and quadrature demodulations to the plurality of carrier sensing signals R1~RN to generate and store a plurality of phase delay information if the carrier touch sensing system 10 operates in the phase calibration mode. Or, the demodulation circuit 100 may perform in-phase demodulation to the plurality of carrier sensing signals R1~RN according to the plurality of phase delay information to generate the plurality of touch signals A1~AN if the carrier touch sensing system 10 operates in the normal scan mode.

Figure 2:
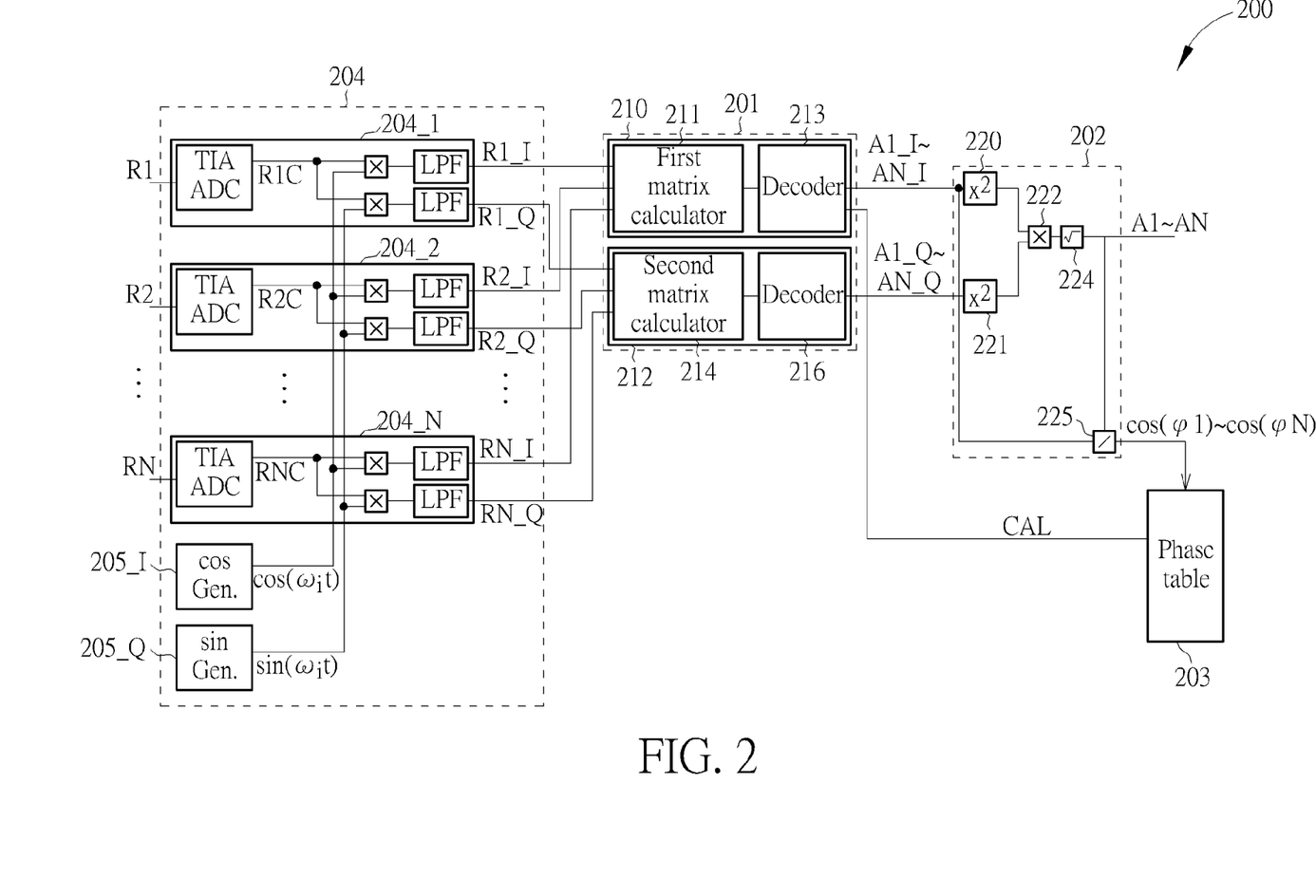
FIG. 2 is a schematic diagram of a demodulation circuit when the carrier touch sensing system shown in FIG. 1 operates in the phase calibration mode according to an embodiment of the present invention.

Please refer to FIG. 2, which is a schematic diagram of a demodulation circuit 200 when the carrier touch sensing system 10 operates in the phase calibration mode according to an embodiment of the present invention. The demodulation circuit 200 may replace the demodulation circuit 100 in FIG. 1, and include a quadrature demodulation circuit 204, a signal processing circuit 201, a computing circuit 202 and a phase table 203.

In structure, the quadrature demodulation circuit 204 is coupled to the touch panel 102 for performing in-phase and quadrature demodulations to the plurality of carrier sensing signals R1~RN to generate a plurality of in-phase sensing signals R1_I~RN_I and a plurality of quadrature sensing signals R1_Q~RN_Q. The signal processing circuit 201 is coupled to the quadrature demodulation circuit 204, the computing circuit 202 and the phase table 203, and used for detecting the touch event on the touch panel 102 to generate a plurality of in-phase touch signals A1_I~AN_I and a plurality of quadrature touch signals A1_Q~AN_Q according to the plurality of in-phase sensing signals R1_I~RN_I and the plurality of quadrature sensing signals R1_Q~RN_Q.

The signal processing circuit 201 is further used for detecting whether the in-phase sensing signals R1_I~RN_I and the plurality of quadrature sensing signals R1_Q~RN_Q are interfered by an irregular noise to generate a phase calibration indication CAL.

The computing circuit 202 is coupled to the signal processing circuit 201 and the phase table 203 for generating the plurality of touch signals A1~AN according to the plurality of in-phase touch signals A1_I~AN_I and the plurality of quadrature touch signals A1_Q~AN_Q. The signal processing circuit 201 is further used for generating phase delay information $\cos(\varphi 1)$ to $\cos(\varphi N)$ according to the in-phase touch signals A1_I~AN_I and the touch signals A1~AN.

The phase table 203 is coupled to the signal processing circuit 201 and the computing circuit 202 for storing and refreshing the phase delay information $\cos(\varphi 1)$ to $\cos(\varphi N)$ if the phase calibration indication CAL indicates that a phase calibration procedure is required. The phase table 203 may be a memory device or a register array.

In operation, note that performance of the touch panel 102 varies due to its production process, operating mode, environment temperature, humidity, noises as well as an occurrence of the touch event, which results in the plurality of carrier sensing signals R1~RN to be denoted, in real-time, as:

$$RX(t) = \sum_{i=1}^{m} R_i \cos(\omega_i t + \phi_i) + \varepsilon(t) \quad (20.1)$$

where X is an integer ranged from 1 to N; t is time; m is a number of carrier frequencies, which means that the carrier sensing signal RX includes m frequency components; $R_i$ is $i^{th}$ real touch signal; $\omega_i$ is $i^{th}$ carrier frequency; $\varphi_i$ is $i^{th}$ real phase delay; and $\varepsilon(t)$ is a regular noise.

The quadrature demodulation circuit 204 includes demodulation units 204_1~204_N and carrier signal generators 205_I and 205_Q. The carrier signal generators 205_I and 205_Q are used for generating carrier signals $\cos(\omega_i t)$ and $\sin(\omega_i t)$, respectively. Each of the demodulation units 204_1~204_N is structurally and functionally identical. Take the demodulation units 204_1 for example, which includes a Trans-Impedance Amplifier (TIA) and analog-to-digital converter (ADC), first and second multipliers and first and second Low Pass Filters (LPFs). The carrier sensing signal R1 may be compensated with direct-currents and be converted into digital signals by the TIA-ADC to generate a compensated carrier sensing signal R1C, thereby equation (1), in real-time, may be rewritten into:

$$RXC(t) = \sum_{i=1}^{m} R_i \cos(\omega_i t + \phi_i) + C_i + \varepsilon(t) \quad (20.2)$$

$C_i$ is $i^{th}$ direct-current compensated to the carrier sensing signal RX.

The compensated carrier sensing signal R1C may be multiplied by the carrier signals $\cos(\omega_i t)$ and then be filtered by the LPF to generate the in-phase sensing signal R1_I. Meanwhile, the compensated carrier sensing signal R1C may also be multiplied by the carrier signals $\sin(\omega_i t)$ and then be filtered by the LPF to generate the quadrature sensing signal R1_Q. The in-phase sensing signal RX_I and the quadrature sensing signal RX_Q may be respectively denoted as:

$$RX\_I = \sum_{i=1}^{m} \frac{1}{2} R_i \cos(\phi_i) \quad (20.3)$$

$$RX\_Q = \sum_{i=1}^{m} \frac{1}{2} R_i \sin(\phi_i) \quad (20.4)$$

A conversion equation of the quadrature demodulation circuit 204 may be denoted as:

$$[\beta_1 \ \ldots \ b_1 \ \ldots \ C_1 \ \ldots]^T = \left\{ \frac{2}{P} \sum_{t=1}^{P} V(t) RXC(t) \right\} \quad (20.5)$$

where $V(t) \equiv [\cos \omega_1 t \ldots \sin \omega_1 t \ldots 1 \ldots]^T$; P is time; $\beta_i$ is $i^{th}$ component of the in-phase sensing signal RX_I; and $b_i$ is $i^{th}$ component of the quadrature sensing signal RX_Q. $\beta_i$ and $b_i$ may be respectively denoted as:

$$\begin{cases} \beta_i = R_i \cos(\phi_i) \\ b_i = R_i \sin(\phi_i) \end{cases} \quad (20.6)$$

Please note that, in view of statistics, m frequency components in the compensated sensing signal RXC(t) (or in the sensing signal RX(t)) are linearly independent from each other, and can be regarded as a set of linear equations. Assume that the compensated sensing signal RXC(t) in view of statistics is regarded as a set of m linear regression models, by means of the Least Square Method, a set of linear equations with least square errors may be obtained when interfering by the regular noise $\varepsilon(t)$. Equation (20.5) is a solution of a target equation according to the Least Square Method, and the target equation may be denoted as:

$$\min_{\{\beta_k, b_k\}} \sum_{t=1}^{P} \left\{ RXC(t) - \sum_{i=1}^{m} (\beta_k \cos\omega_k t + b_k \sin\omega_k t + C_i) \right\}^2 \quad (20.7)$$

where K is $K^{th}$ linear regression equation to be estimated; and P is time.

The in-phase sensing signals R1_I~RN_I and the plurality of quadrature sensing signals R1_Q~RN_Q are further processed by the signal processing circuit 201 in order to detect the touch event and determine if the in-phase sensing signals R1_I~RN_I and the plurality of quadrature sensing signals R1_Q~RN_Q are noisy.

In detail, the signal processing circuit 201 includes a first signal processing channel 210 and a second signal processing channel 212. The first signal processing channel 210 includes a first matrix calculator 211 and a decoder 213. The second signal processing channel 212 includes a second matrix calculator 214 and a decoder 216. The first signal processing channel 210 is used for generating the plurality of in-phase touch signals A1_I~AN_I according to the plurality of in-phase sensing signals R1_I~RN_I via the first matrix calculator 211. The second signal processing channel 212 is used for generating the plurality of quadrature touch signals A1_Q~AN_Q according to the plurality of quadrature sensing signals R1_Q~RN_Q via the second matrix calculator 214. The decoders 213 and 216 are used for detecting whether the in-phase sensing signals R1_I~RN_I and the plurality of quadrature sensing signals R1_Q~RN_Q are interfered by the irregular noise to generate the phase calibration indication CAL.

The plurality of in-phase touch signals A1_I~AN_I and the plurality of quadrature touch signals A1_Q~AN_Q may be respectively denoted as:

$$\begin{cases} AX\_I = \sum_{i=1}^{m} A_i \cos(\phi_i) \\ AX\_Q = \sum_{i=1}^{m} A_i \sin(\phi_i) \end{cases} \quad (21.1;\ 21.2)$$

where $A_i$ is $i^{th}$ approximation of the real touch signal $R_i$.

According to equation (20.6) and (20.7), the touch signal AX and the phase delay φX are approximations of the real touch signal $R_i$ and the real phase delay $\varphi_i$, and may satisfy the following equations:

$$AX = \sqrt{(AX\_I^2 + AX\_Q^2)} \approx R_i = \sqrt{(\beta_i^2 + b_i^2)} \quad (22.1)$$

$$\cos(\phi X) = \frac{AX\_I}{AX} \approx \cos(\phi_i) = \frac{\beta_i}{R_i} \quad (22.2)$$

where equation (22.1) is a first conversion equation of the computing circuit 202. In detail, the computing circuit 202 includes two squarer(s) 220 and 221, an adder 222 and a square-root generator 224, so as to perform the conversion equation (22.1) to generate the plurality of touch signals A1~AN.

Equation (22.2) is a second conversion equation of the computing circuit 202. In detail, the signal processing circuit 201 further includes a divider 225 coupled to the square-root generator 224, the squarer 220 and the phase table 203, and used for generating the phase delay information cos(φ1) to cos(φN) via dividing the in-phase touch signals A1_I~AN_I by the touch signals A1~AN.

Noticeably, since equation (20.6) assumes that $\beta_i$ and $b_i$ are linearly dependent since they have the same variable (i.e. the phase delay $\varphi_i$), the demodulation circuit 204 must perform in-phase and quadrature demodulations to the compensated sensing signal RXC(t) at the same time to obtain the phase delays φ1~φN (or the phase delay information cos(φ1) to cos(φN)) with highest correctness, which generates the touch signals A1~AN with highest signal intensity.

In short, the demodulation circuit 200 is designed according to the Least Square Method to perform quadrature demodulation to the carrier sensing signals R1~RN, so as to obtain the approximated touch signals A1~AN and the approximated phase delays φ1~φN with least square errors when interfering by the regular noise ε (t). In other words, the touch signals A1~AN and the approximated phase delays φ1~φN with highest correctness may be demodulated to ensure following signal processing of electronic devices integrated with the carrier touch sensing system 10. In addition, by compensating the carrier sensing signals R1~RN with the direct-current $C_i$, signal intensities of the approximated touch signals A1~AN may be increased to relatively decrease a signal intensity of the regular noise ε (t), which effectively increases a Signal-to-Noise Ratio (SNR) of the carrier touch sensing system 10.

Figure 3:
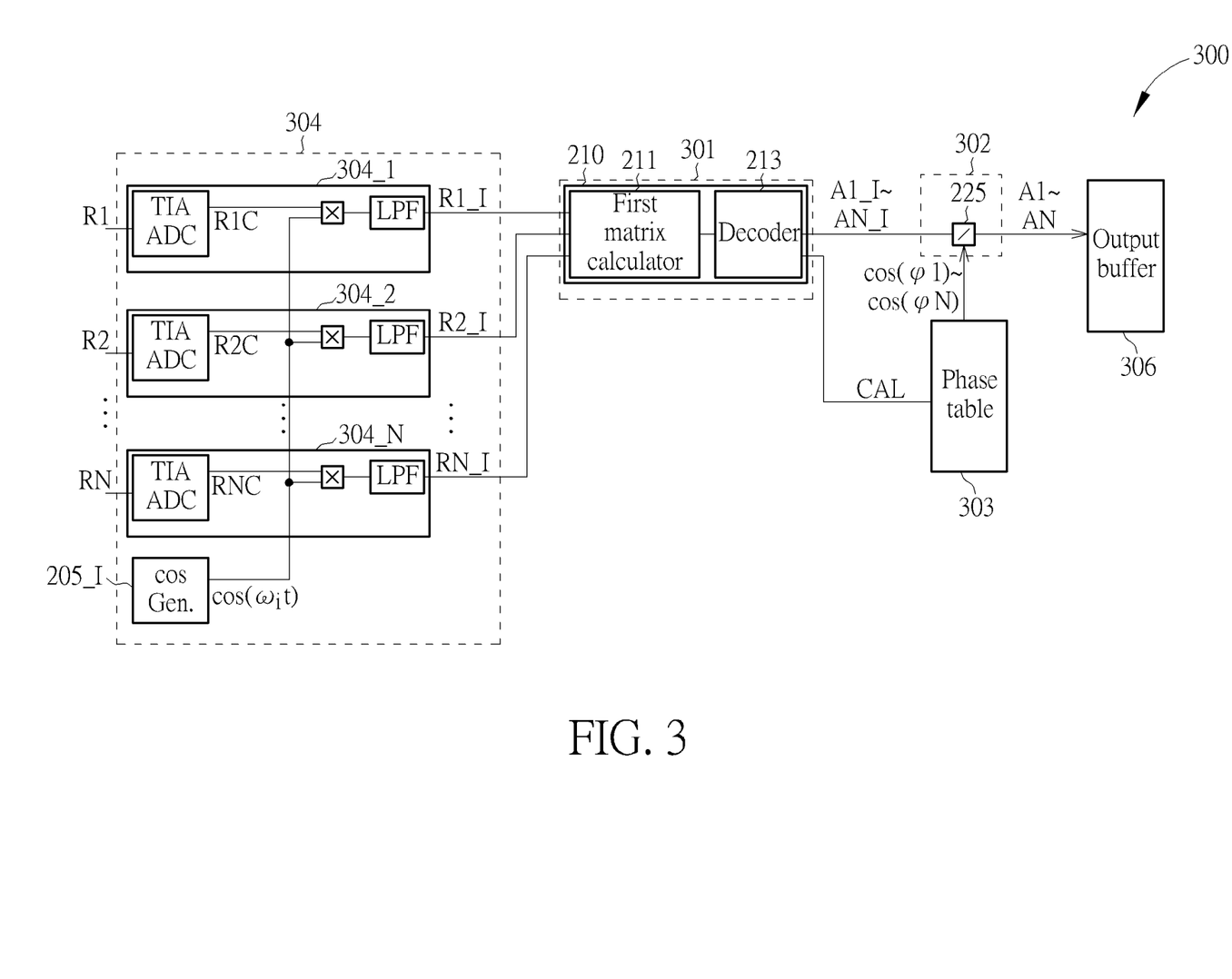
FIG. 3 to FIG. 5 are schematic diagrams of a demodulation circuit when the carrier touch sensing system shown in FIG. 1 operates in the normal scan mode according to various embodiments of the present invention.

Please refer to FIG. 3, which is a schematic diagram of a demodulation circuit 300 when the carrier touch sensing system 10 operates in the normal scan mode according to another embodiment of the present invention. The demodulation circuit 300 may replace the demodulation circuit 100 in FIG. 1, and include an in-phase demodulation circuit 304, a signal processing circuit 301, a computing circuit 302, a phase table 303 and an output buffer 306.

The demodulation circuit 300 is generic from the demodulation circuit 200. Elements in FIG. 2 associated with quadrature operations are disabled to form the demodulation circuit 300 in FIG. 3, i.e. the second signal processing channel 212, the carrier signal generator 205_Q, and the multiplier and the LPF for generating the quadrature sensing signals R1_Q~RN_Q are disabled.

In operation, the in-phase demodulation circuit 304 performs in-phase demodulation to the carrier sensing signals R1~RN to generate the in-phase carrier sensing signals R1_I~RN_I. The signal processing circuit 301 utilizes the first signal processing channel 210 to detect the touch event on the touch panel 102 and generate the plurality of in-phase touch signals A1_I~AN_I according to the plurality of in-phase sensing signals R1_I~RN_I via the first matrix calculator 211. The signal processing circuit 301 further detects if the in-phase carrier sensing signals R1_I~RN_I is interfered by the irregular noise to generate the phase calibration indication CAL. The computing circuit 302 generates the touch signals A1~AN according to equation (22.1) via dividing the in-phase touch signals A1_I~AN_I by the phase delay information cos(φ1) to cos(φN). Herein the computing circuit 302 only includes the divider 225; in other words, the squarer(s) 220 and 221, the adder 222 and the square-root generator 224 of the computing circuit 202 are disabled. The output buffer 306 is coupled to the divider 225 of the computing circuit 302 for holding the touch signals A1~AN for further signal processing.

In short, when operating in the normal scan mode, the demodulation circuit 300 only performs in-phase demodulation to the carrier sensing signals R1~RN. Since the phase delay information cos(φ1) to cos(φN) are known and stored in the phase table 303, the computing circuit 302 may generate the touch signals A1~AN according to equation (22.1) via dividing the in-phase touch signals A1_I~AN_I by the phase delay information $\cos(\varphi 1)$ to $\cos(\varphi N)$. Therefore, compared with the phase calibration mode (i.e. operations of the demodulation circuit 200 shown in FIG. 2), operations of the demodulation circuit 300 may be simplified to reduce power consumption.

Figure 4:
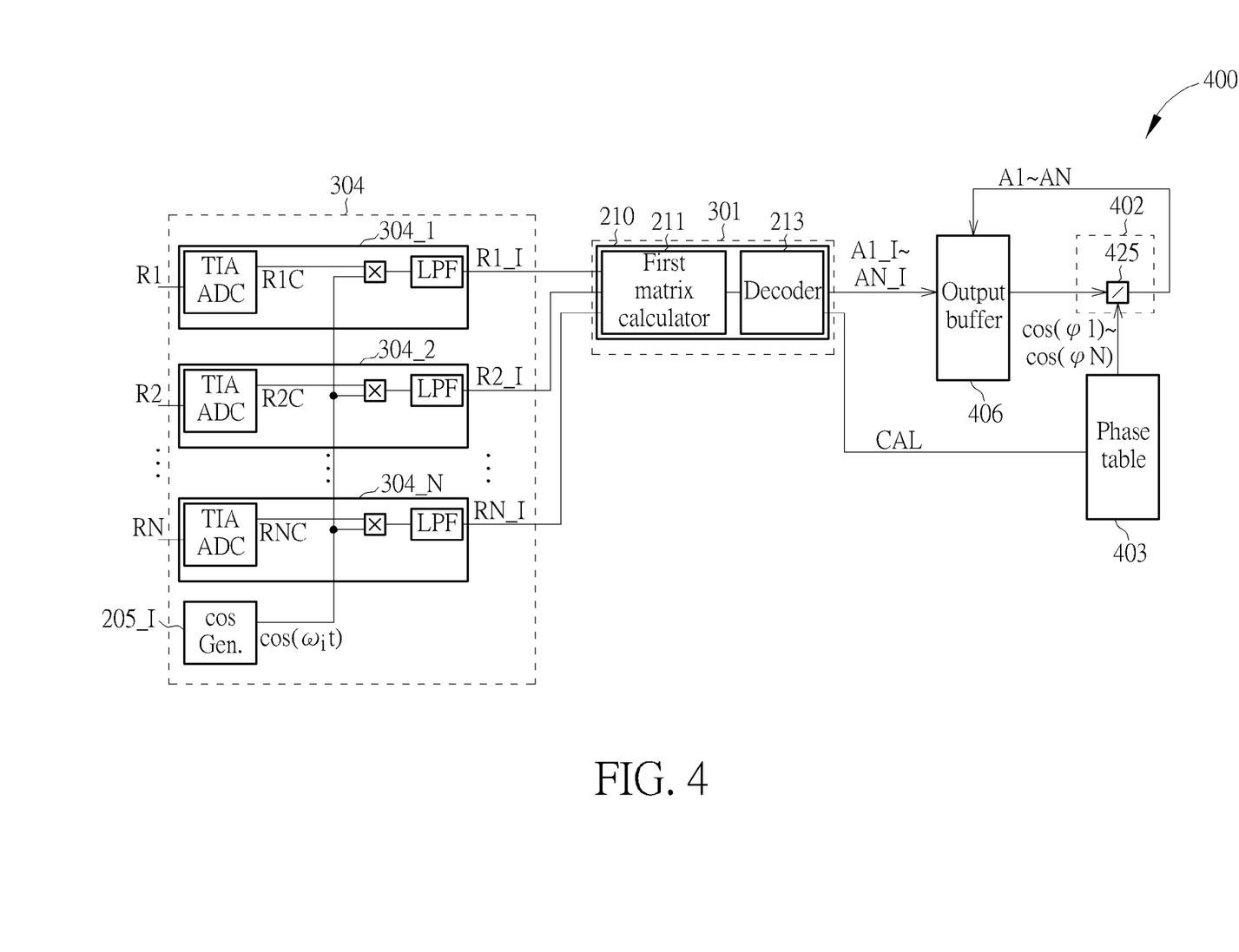

Please refer to FIG. 4, which is a schematic diagram of a demodulation circuit 400 when the carrier touch sensing system 10 operates in the normal scan mode according to another embodiment of the present invention. The demodulation circuit 400 may replace the demodulation circuit 100 in FIG. 1, and include the in-phase demodulation circuit 304, the signal processing circuit 301, a computing circuit 402, a phase table 403 and an output buffer 406.

Structures of the demodulation circuits 300 and 400 are similar, differences are that the in-phase touch signals A1_I~AN_I are stored in the output buffer 406 in advanced, and the computing circuit 402 generates the touch signals A1~AN later.

The output buffer 406 is coupled between the signal processing circuit 301 and the computing circuit 402 for holding the in-phase touch signals A1_I~AN_I and the touch signals A1~AN. The computing circuit 402 includes a divider 425 coupled to the output buffer 406 and the phase table 403, and used for generating the touch signals A1~AN via dividing the in-phase touch signals A1_I~AN_I by the phase delay information $\cos(\varphi 1)$ to $\cos(\varphi N)$.

Note that the divider 225 in FIG. 2 and FIG. 3 may be realized by hardware circuits, which provides instant operations to reach fast computation but also requires a larger hardware area. While the divider 425 in FIG. 4 may be realized by a software program, which saves the hardware area but also slows the computation of the demodulation circuit 400.

Figure 5:
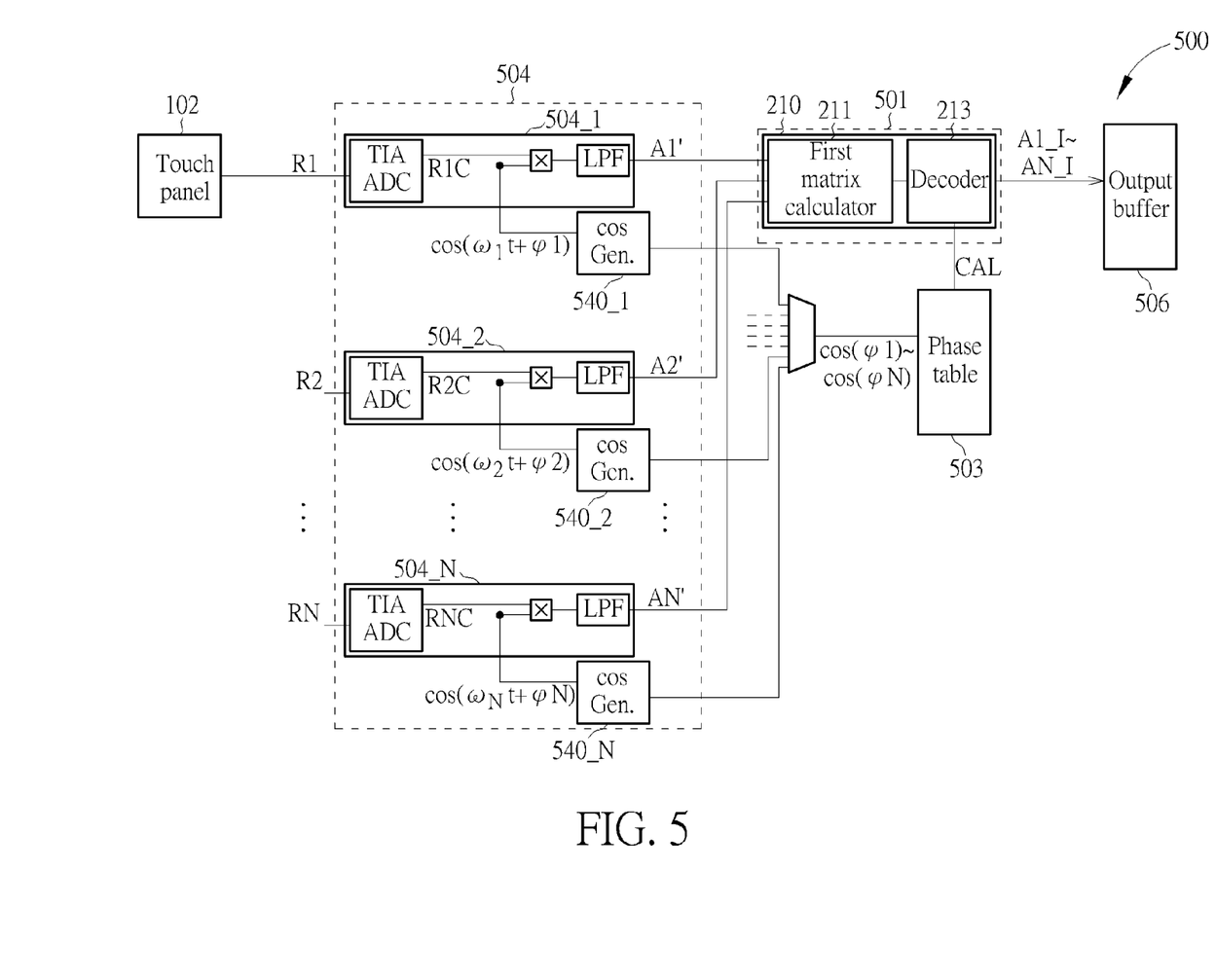

Please refer to FIG. 5, which is a schematic diagram of a demodulation circuit 500 when the carrier touch sensing system 10 operates in the normal scan mode according to another embodiment of the present invention. The demodulation circuit 500 may replace the demodulation circuit 100 in FIG. 1, and includes an in-phase demodulation circuit 504, a signal processing circuit 501, a phase table 503 and an output buffer 506.

In structure, the in-phase demodulation circuit 504 is coupled to the phase table 503 and the signal processing circuit 501 for generating a plurality of raw touch signals A1'-AN' according to the carrier sensing signals R1~RN and the phase delay information $\cos(\varphi 1)$ to $\cos(\varphi N)$. The signal processing circuit 501 is coupled to the output buffer 506 and the in-phase demodulation circuit 504 for generating the touch signals A1~AN according to the raw touch signals A1'~AN'. The output buffer 506 is coupled to the signal processing circuit 501 for holding the touch signals A1~AN.

Note that the in-phase demodulation circuit 504 uses in-phase carrier signals with the phase delays $\varphi 1$~$\varphi N$ to perform in-phase demodulation to the carrier sensing signals R1~RN, so as to generate the plurality of raw touch signals A1'~AN'.

In detail, the in-phase demodulation circuit 504 includes a multiplexer 540, in-phase carrier signal generators 540_1~540_N and demodulation units 504_1~504_N. The multiplexer 540 is coupled to the phase table 503 and the in-phase carrier signal generators 540_1~540_N for receiving the phase delay information $\cos(\varphi 1)$ to $\cos(\varphi N)$ from the phase table 503 and respectively transmitting the phase delay information $\cos(\varphi 1)$ to $\cos(\varphi N)$ to the in-phase carrier signal generators 540_1~540_N. The in-phase carrier signal generators 540_1~540_N are respectively coupled to the demodulation units 504_1~504_N for generating the in-phase carrier signals with the phase delays $\varphi 1$~$\varphi N$, which may be denoted as $\cos(\omega_c t+\varphi_i)$. Each of the demodulation units 504_1~504_N includes a TIA-ADC, a multiplier and a LPF, and used for generating the raw touch signals A1'~AN' according to the carrier sensing signals R1~RN and the in-phase carrier signals with the phase delays $\varphi 1$~$\varphi N$. After processing to the raw touch signals A1'~AN' by the processing circuit 501 to generate the touch signals A1~AN, the touch signals A1~AN may be stored/held in the output buffer 506.

Note that the raw touch signals A1'~AN' only include direct-current signal component because frequency components regarding the phase delays $\varphi 1$~$\varphi N$ have been eliminated by the in-phase demodulation circuit 504 during the in-phase demodulation procedure. In such a situation, a computing circuit is not necessary for the demodulation circuit 500 (i.e. the signal processing circuit 202 shown in FIG. 2 is disabled), which speeds up computation of the demodulation circuit 500 but also requires a larger hardware area for the multiplexer 540 and in-phase carrier signal generators 540_1~540_N.

Note that in embodiments of FIG. 3 to FIG. 5, the signal processing circuit 301, 401 or 501 is further used for detecting whether the in-phase sensing signals A1_I~AN_I or the raw touch signals A1'~AN' are interfered by an irregular noise to generate the phase calibration indication CAL to the phase table 303, 403 or 503, wherein the carrier touch sensing system 10 switches from the normal scan mode to the phase calibration mode according to the phase calibration indication CAL.

Figure 6:
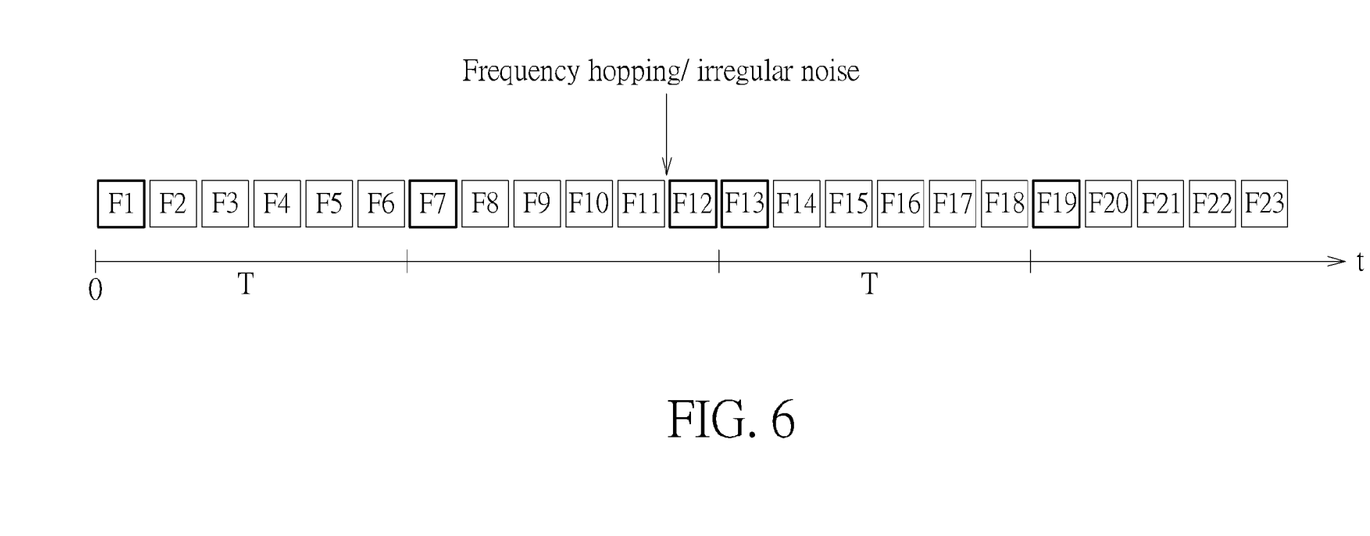
FIG. 6 illustrates mode-switching operations of the carrier touch sensing system shown in FIG. 1.

Please refer to FIG. 6, which illustrates mode-switching operations of the carrier touch sensing system 10. Frames F1, F7, F12, F13 and F19 are scanned by the carrier sensing system 10 when operating in the phase calibration mode; while frames F2-F6, F8-F11, F14-F18 and F20-F23 are scanned by the carrier sensing system 10 when operating in the normal scan mode. T is a calibration period, and t is time. As shown in FIG. 6, the carrier touch sensing system 10 performs the phase calibration procedure in the first frame F1 when firstly turned on for initialization. If environmental conditions (e.g. temperature, humidity, operating frequency, and so on) remain the same during the period T, the carrier touch sensing system 10 periodically/regularly performs the phase calibration procedure to refresh the phase delay information $\cos(\varphi 1)$ to $\cos(\varphi N)$ in the phase table. If the environmental conditions change, e.g. frequency hopping or an irregular noise is detected in the frame F11, the carrier touch sensing system 10 performs the phase calibration procedure in the frames 12 and 13, and then switches to the normal scan mode.

To sum up, the carrier touch sensing system of the present invention may operate in the phase calibration mode or the normal scan mode, the circuit structure of the demodulation circuit may be changed to adapt to different modes. When operating in the phase calibration mode, the demodulation circuit is designed according to the Least Square Method to perform in-phase and quadrature demodulations to the carrier sensing signals, so as to obtain the touch signals and the phase delays with least square errors and the highest signal intensities. On the other hand, when operating in the normal calibration mode, the demodulation circuit performs in-phase demodulation to the carrier sensing signals according to the phase delay information stored in the phase table to obtain the touch signals, which reduces power consumptions of the demodulation circuit because elements associated with quadrature operations are disabled.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A carrier touch sensing system, comprising:
 a driving circuit, for generating a plurality of driving signals;
 a touch panel, coupled to the driving circuit, for generating a plurality of carrier sensing signals according to the plurality of driving signals; and
 a demodulation circuit, coupled to the touch panel,
 wherein, during a phase calibration mode, the demodulation circuit performs in-phase and quadrature demodulations to the plurality of carrier sensing signals according to a least square method, to generate and store a plurality of in-phase touch signals and a plurality of phase delay information,
  wherein the plurality of in-phase touch signals comprises a plurality of least square errors among the plurality of carrier sensing signals, a plurality of in-phase sensing signals and a plurality of quadrature sensing signals derived from the in-phase and quadrature demodulations
  wherein the plurality of phase delay information is generated via dividing the plurality of in-phase touch signals by a plurality of touch signals,
 wherein, during a normal scan mode, the demodulation circuit performs in-phase demodulation to the plurality of carrier sensing signals according to the plurality of phase delay information to generate the plurality of touch signals via dividing the plurality of in-phase touch signals by the plurality of phase delay.

2. The carrier touch sensing system of claim 1, wherein during the phase calibration mode, the demodulation circuit comprises:
 a quadrature demodulation circuit, coupled to the touch panel, for performing in-phase and quadrature demodulations to the plurality of carrier sensing signals to generate the plurality of in-phase sensing signals and the plurality of quadrature sensing signals;
 a signal processing circuit, coupled to the quadrature demodulation circuit, for detecting a touch event on the touch panel to generate the plurality of in-phase touch signals and a plurality of quadrature touch signals according to the plurality of in-phase sensing signals and the plurality of quadrature sensing signals;
 a computing circuit, coupled to the signal processing circuit, for generating the plurality of touch signals according to the plurality of in-phase touch signals and the plurality of quadrature touch signals, and for generating phase delay information according to the plurality of in-phase touch signals and the plurality of touch signals; and
 a phase table, coupled to the signal processing circuit and the computing circuit, for storing and refreshing the phase delay information when a phase calibration indication indicates that a phase calibration procedure is required.

3. The carrier touch sensing system of claim 2, wherein the signal processing circuit is further used for detecting whether the plurality of in-phase sensing signals and the plurality of quadrature sensing signals are interfered by an irregular noise to generate the phase calibration indication to the phase table, wherein the carrier touch sensing system switches from the normal scan mode to the phase calibration mode according to the phase calibration indication.

4. The carrier touch sensing system of claim 2, wherein a first conversion equation of the computing circuit is denoted as:

$$AX = \sqrt{(AX\_I^2 + AX\_Q^2)},$$

wherein X is an integer ranged from 1 to N, AX is one of the plurality of touch signals, AX_I is one of the plurality of in-phase touch signals, and AX_Q is one of the plurality of quadrature touch signals.

5. The carrier touch sensing system of claim 4, wherein a second conversion equation of the computing circuit is denoted as:

$$\cos(\phi X) = \frac{AX\_I}{AX},$$

wherein $\cos(\varphi X)$ is one of the plurality of phase delay information.

6. The carrier touch sensing system of claim 1, wherein at least one of when the carrier touch sensing system is firstly turned on, operating for a period of time, operating performance of the carrier touch sensing system is changed, an operating frequency of the carrier touch sensing system is changed, and an irregular noise is detected, the carrier touch sensing system operates in the phase calibration mode.

7. The carrier touch sensing system of claim 1, wherein during the normal scan mode, the demodulation circuit comprises:
 an in-phase demodulation circuit, coupled to the touch panel, for performing in-phase demodulation to the plurality of carrier sensing signals to generate a plurality of in-phase carrier sensing signals;
 a signal processing circuit, coupled to the in-phase demodulation circuit, for detecting a touch event on the touch panel and generating the plurality of in-phase touch signals according to the plurality of in-phase sensing signals;
 a computing circuit, coupled to the signal processing circuit, for generating the plurality of touch signals according to the plurality of in-phase touch signals and the plurality of phase delay information;
 a phase table, coupled to the signal processing circuit and the computing circuit, for storing the plurality of phase delay information; and
 an output buffer, coupled to the computing circuit, for holding the plurality of touch signals.

8. The carrier touch sensing system of claim 7, wherein the signal processing circuit detects whether the plurality of in-phase sensing signals is interfered by an irregular noise to generate a phase calibration indication to the phase table, wherein the carrier touch sensing system switches from the normal scan mode to the phase calibration mode according to the phase calibration indication.

9. The carrier touch sensing system of claim 7, wherein a conversion equation of the computing circuit is denoted as:

$$AX = \frac{AX\_I}{\cos(\phi X)},$$

wherein X is an integer ranged from 1 to N, AX is one of the plurality of touch signals, AX_I is one of the plurality of in-phase touch signals, and cos(φX) is one of the plurality of phase delay information.

10. The carrier touch sensing system of claim 9, wherein the computing circuit comprises a divider coupled to the signal processing circuit and the phase table for performing the conversion equation, and the divider is realized by hardware circuits.

11. The carrier touch sensing system of claim 1, wherein during the normal scan mode, the demodulation circuit comprises:
- an in-phase demodulation circuit, coupled to the touch panel, for performing in-phase demodulation to the plurality of carrier sensing signals to generate a plurality of in-phase carrier sensing signals;
- a signal processing circuit, coupled to the in-phase demodulation circuit, for detecting a touch event on the touch panel and generating the plurality of in-phase touch signals according to the plurality of in-phase sensing signals;
- an output buffer, coupled to the signal processing circuit, for holding the plurality of in-phase touch signals and the plurality of touch signals;
- a phase table, coupled to the signal processing circuit and the computing circuit, for storing the plurality of phase delay information; and
- a computing circuit, coupled to the output buffer and the phase table, for generating the plurality of touch signals according to the plurality of in-phase touch signals and the plurality of phase delay information.

12. The carrier touch sensing system of claim 11, wherein the signal processing circuit is further used for detecting whether the plurality of in-phase sensing signals is interfered by an irregular noise to generate a phase calibration indication to the phase table, wherein the carrier touch sensing system switches from the normal scan mode to the phase calibration mode according to the phase calibration indication.

13. The carrier touch sensing system of claim 11, wherein a conversion equation of the computing circuit is denoted as:

$$AX = \frac{AX\_I}{\cos(\phi X)},$$

wherein X is an integer ranged from 1 to N, AX is one of the plurality of touch signals, AX_I is one of the plurality of in-phase touch signals, and cos(φX) is one of the plurality of phase delay information.

14. The carrier touch sensing system of claim 13, wherein the computing circuit comprises a divider coupled to the signal processing circuit and the phase table for performing the conversion equation, and the divider is realized by a software program.

15. The carrier touch sensing system of claim 1, wherein during the normal scan mode, the demodulation circuit comprises:
- a phase table, for storing the plurality of phase delay information;
- an in-phase demodulation circuit, coupled to the touch panel and the phase table, for generating a plurality of raw touch signals according to the plurality of carrier sensing signals and the plurality of phase delay information;
- a signal processing circuit, coupled to the in-phase demodulation circuit, for detecting a touch event on the touch panel and generating the plurality of touch signals according to the plurality of raw touch signals; and
- an output buffer, coupled to the signal processing circuit, for holding the plurality of touch signals.

16. The carrier touch sensing system of claim 15, wherein the in-phase demodulation circuit comprises:
- a multiplexer, coupled to the phase table, for receiving the plurality of phase delay information;
- a plurality of in-phase carrier signal generators, respectively coupled to the multiplexer, for generating a plurality of in-phase carrier signals with the phase delays according to the plurality of phase delay information; and
- a plurality of demodulation units, respectively coupled to the plurality of in-phase carrier signal generators and the touch panel, for generating the plurality of raw touch signals according to the plurality of carrier sensing signals and the plurality of in-phase carrier signals with the phase delays, wherein the plurality of in-phase carrier signals with the phase delays is denoted as $\cos(w_i t + \phi_i)$, $w_i$ is $i^{th}$ carrier signal without a phase delay, $\phi_i$ is $i^{th}$ phase delay corresponding to one of the plurality of phase delay information.

17. The carrier touch sensing system of claim 15, wherein the signal processing circuit is further used for detecting whether the plurality of in-phase sensing signals is interfered by an irregular noise to generate a phase calibration indication to the phase table, wherein the carrier touch sensing system switches from the normal scan mode to the phase calibration mode according to the phase calibration indication.

* * * * *